United States Patent
Steinmetz et al.

(10) Patent No.: US 12,422,365 B2
(45) Date of Patent: Sep. 23, 2025

(54) CONTROLLER FOR AN IMAGING DEVICE AND METHOD

(71) Applicant: LEICA MICROSYSTEMS CMS GMBH, Wetzlar (DE)

(72) Inventors: Irmtraud Steinmetz, Wetzlar (DE); Luis Alvarez, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 326 days.

(21) Appl. No.: 18/331,969

(22) Filed: Jun. 9, 2023

(65) Prior Publication Data
US 2023/0400411 A1    Dec. 14, 2023

(30) Foreign Application Priority Data

Jun. 10, 2022 (EP) ..................................... 22178513

(51) Int. Cl.
G01N 21/64 (2006.01)
(52) U.S. Cl.
CPC . G01N 21/6458 (2013.01); *G01N 2021/6419* (2013.01); *G01N 2021/6421* (2013.01); *G01N 2201/06113* (2013.01)
(58) Field of Classification Search
None
See application file for complete search history.

(56) References Cited

U.S. PATENT DOCUMENTS 5,294,799 A * 3/1994 Aslund ............... G01N 21/6408
250/459.1
5,424,841 A * 6/1995 Van Gelder ........ G01N 21/6456
356/417

(Continued)

FOREIGN PATENT DOCUMENTS

EP          3761010 A1   1/2021
WO   WO 2019/138028 A1   7/2019

OTHER PUBLICATIONS

M. J. Roberti et al., "TauSense: a fluorescence lifetime-based tool set for everyday imaging", Nature Methods, Sep. 2020, UK, pp. 1-3.

(Continued)

*Primary Examiner* — David P Porta
*Assistant Examiner* — Djura Malevic
(74) *Attorney, Agent, or Firm* — LEYDIG, VOIT & MAYER, LTD.

(57) ABSTRACT

A controller for an imaging device is configured to control an optical detection unit to receive fluorescence light emitted by first and second fluorophore species excited by first and second excitation light, respectively, to separate the fluorescence light into at least two spectral detection channels corresponding to two wavelength bands, respectively. A first wavelength band includes an emission spectrum of the first fluorophore species. A second wavelength band includes an emission spectrum of the second fluorophore species. The controller is further configured to control the optical detection unit to detect photon arrival times of the fluorescence light relative to light pulses of the second excitation light, to determine a temporal correlation between the light pulses and the photon arrival times, and to determine a first number and a second number of photons received in the first spectral detection channel and/or the second spectral detection channel based on the temporal correlation.

15 Claims, 9 Drawing Sheets

(56) References Cited

U.S. PATENT DOCUMENTS

| | | | | |
|---|---|---|---|---|
| 5,749,830 | A * | 5/1998 | Kaneko | A61B 1/0638 348/E5.038 |
| 6,122,042 | A * | 9/2000 | Wunderman | A61B 1/0607 356/73 |
| 7,456,954 | B2 * | 11/2008 | Weiss | G01N 21/6445 356/417 |
| 10,684,224 | B2 * | 6/2020 | Dimitriadis | G01J 3/10 |
| 11,703,454 | B2 * | 7/2023 | Chang | G06T 7/0012 250/459.1 |
| 11,788,948 | B2 * | 10/2023 | Ota | G01N 15/1459 356/39 |
| 11,988,606 | B2 * | 5/2024 | Chang | G01N 21/6428 |
| 12,259,311 | B2 * | 3/2025 | Ota | G01N 15/1434 |
| 2004/0238756 | A1 * | 12/2004 | Rigler | G01N 21/6428 250/458.1 |
| 2010/0304358 | A1 * | 12/2010 | Nie | B82Y 15/00 436/86 |
| 2011/0249911 | A1 * | 10/2011 | Determan | G06V 20/695 382/282 |
| 2013/0119276 | A1 * | 5/2013 | Widzgowski | G01N 21/6408 250/200 |
| 2017/0053397 | A1 * | 2/2017 | Chukka | G06F 18/23 |
| 2017/0176336 | A1 * | 6/2017 | Dimitriadis | A61B 5/0071 |
| 2019/0220981 | A1 * | 7/2019 | Chen | G06V 20/695 |
| 2019/0339203 | A1 * | 11/2019 | Miller | G01N 21/6458 |
| 2020/0080940 | A1 * | 3/2020 | Garsha | G01N 21/6456 |
| 2021/0089749 | A1 * | 3/2021 | Amthor | G06T 5/70 |
| 2022/0215517 | A1 * | 7/2022 | Chang | G06T 7/0012 |
| 2022/0276250 | A1 * | 9/2022 | Yasuda | G01N 1/36 |
| 2023/0400411 | A1 * | 12/2023 | Steinmetz | G01N 21/6408 |
| 2024/0255497 | A1 * | 8/2024 | Alsheimer | G01N 33/5302 |
| 2024/0377323 | A1 * | 11/2024 | Cushing | G01N 21/6408 |

OTHER PUBLICATIONS

D. R. James et al., "Recovery of underlying distributions of lifetimes from fluorescence decay data", Chemical Physics Letters, vol. 126, Issue 1, Apr. 25, 1986, pp. 7-11, Elsevier Science Publishers B.V., Netherlands.

F. Mérola et al., "Picosecond tryptophan fluorescence of thioredoxin: evidence for discrete species in slow exchange", Biochemistry 1989, 28, 8, Apr. 1989, pp. 3383-3398, American Chemical Society, US.

M.A. Digman et al., "The Phasor Approach to Fluorescence Lifetime Imaging Analysis", Biophys. J. (2008) vol. 94, iss. 2, pp. L14-L16, Cell Press, US, Jan. 15, 2008.

E. Gratton, "The Phasor approach: Application to FRET analysis and Tissue Autofluorescence", 13th LFD workshops 2018, Oct. 22-26, 2018, Laboratory for Fluorescence Dynamics (LFD), University of California, Irvine, USA, pp. 1-55.

Lanzanò et al. (2015), "Encoding and decoding spatio-temporal information for super-resolution microscopy", Nature Communications, 6:6701, 10.1038/ncomms7701, UK, Apr. 2, 2015, pp. 1-9.

B.K. Müller et al.: "Pulsed Interleaved Excitation", Biophysical Journal, vol. 89, pp. 3508-3522, Nov. 2005, Cell Press, US.

* cited by examiner

CONTROLLER FOR AN IMAGING DEVICE AND METHOD

CROSS REFERENCE TO RELATED APPLICATIONS

This application claims benefit to European Patent Application No. EP 22178513.2, filed on Jun. 10, 2022, which is hereby incorporated by reference herein.

FIELD

Embodiments of the present invention relate to a controller for an imaging device. Embodiments of the present invention further relate to a method for spectral unmixing.

BACKGROUND

In fluorescence microscopy, spectral unmixing refers to a class of methods for decomposing a recorded spectrum of fluorescence light into the spectra of different fluorophore species. The contribution of an individual fluorophore species to the recorded spectrum is typically extracted based on spectral characteristics of the emission spectrum of the fluorophore species. Known methods using spectral characteristics of fluorophore species include for example linear spectral unmixing, phasor unmixing and hyperspectral unmixing. However, extracting the spectra of individual fluorophore species becomes increasingly difficult the more overlap between the emission spectra exists. Further, the quality of the result of the unmixing depends heavily on a proper understanding of the spectral properties of the fluorophore species, in particular on how these spectral properties change in a given sample.

The fluorescence lifetime of a fluorophore species may also be used in order to separate individual spectra. Known lifetime-based methods for unmixing include TauSeparation (see for example M. J. Roberti et al., TauSense: a fluorescence lifetime-based tool set for everyday imaging, Nature Methods, September 2020, being based on D. R. James et al., Recovery of underlying distributions of lifetimes from fluorescence decay data, Chemical Physics Letters, Volume 126, Issue 1, 1986, Pages 7-11, and/or F. Merola et al., Picosecond tryptophan fluorescence of thioredoxin: evidence for discrete species in slow exchange, Biochemistry 1989, 28, 8, 3383-3398), pattern fit separation and phasor separation. The fluorescence lifetime may either be used as additional information or the unmixing may be entirely based on fluorescence lifetime. Using fluorescence lifetime as a characteristic feature to separate the spectra of different fluorophore species allows for the separation of emission spectra regardless of their spectral overlap as long as the fluorophore species have different fluorescence lifetimes. There are also disadvantages to using lifetime-based unmixing methods. Typically, lifetime-based approaches to spectral unmixing require a high photon budget that may not be available. Lifetime-based approaches also require an advanced determination of the fluorescence lifetimes of the fluorophore species being used.

SUMMARY

Embodiments of the present invention provide a controller for an imaging device. The controller is configured to control a continuous light source of the imaging device to emit first excitation light in order to excite first fluorophore species. The first excitation light has a first wavelength range. The controller is further configured to control a pulsed light source of the imaging device to emit second excitation light in order to excite second fluorophore species. The second excitation light has a second wavelength range. The controller is further configured to control an optical detection unit of the imaging device to receive fluorescence light emitted by the excited first fluorophore species and the excited second fluorophore species, and to control the optical detection unit of the imaging device to separate the received fluorescence light into at least a first spectral detection channel and a second spectral detection channel. The first spectral detection channel corresponds to a first wavelength band comprising at least a part of an emission spectrum of the first fluorophore species. The second spectral detection channel corresponds to a second wavelength band comprising at least a part of an emission spectrum of the second fluorophore species. The controller is further configured to control the optical detection unit of the imaging device to detect photon arrival times of the received fluorescence light relative to light pulses of the second excitation light, to determine a temporal correlation between the light pulses of the second excitation light and the photon arrival times, and to determine a first number of photons and a second number of photons received in the first spectral detection channel and/or the second spectral detection channel based on the temporal correlation. The first number counts photons emitted by the first fluorophore species. The second number counts photons emitted by the second fluorophore species.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
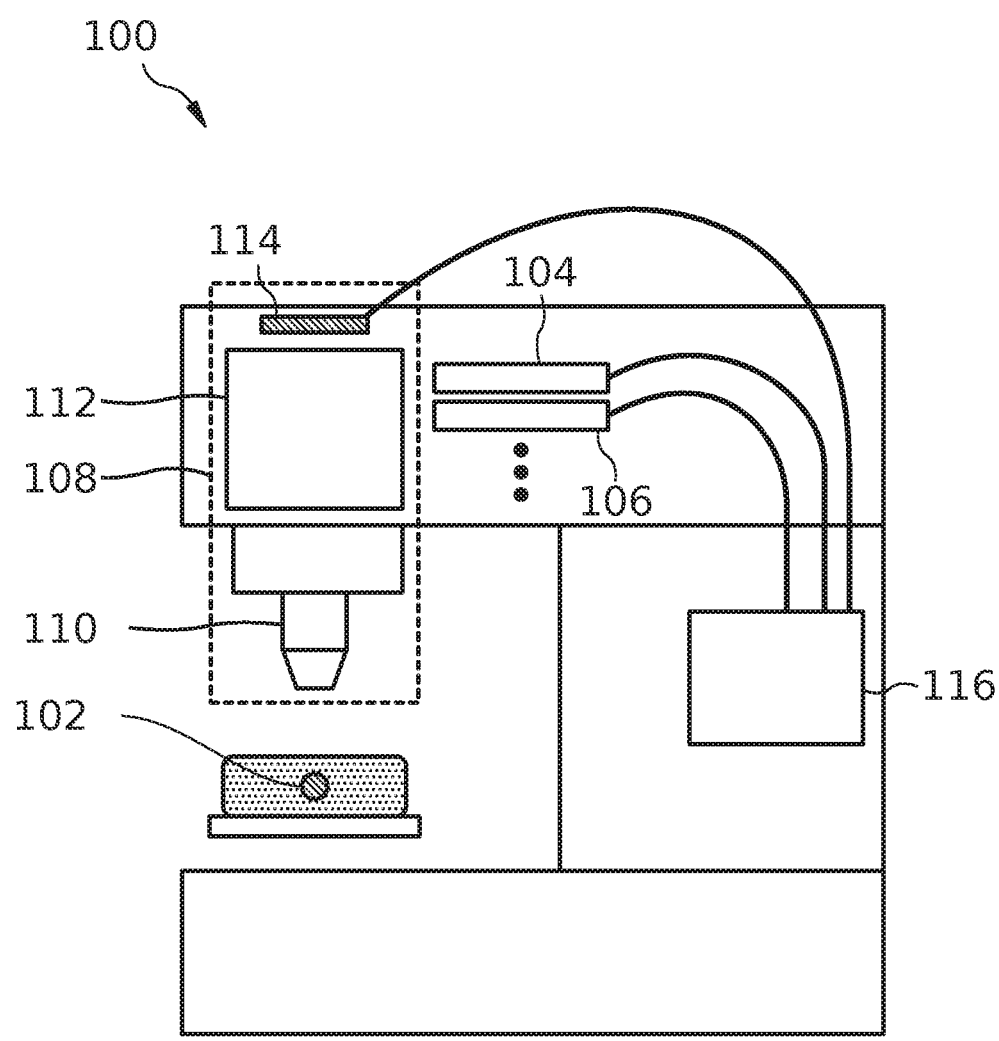
FIG. 1 is a schematic view of an imaging device according to an embodiment.

Embodiments of the present invention provide a controller for an imaging device and a method for spectral unmixing that allow for a robust spectral unmixing and do not require a priori knowledge of a fluorescence lifetime of the fluorophore species used.

According to some embodiments, the controller for an imaging device is configured to control a continuous light source of the imaging device to emit first excitation light in order to excite first fluorophore species, and to control a pulsed light source of the imaging device to emit second excitation light in order to excite second fluorophore species. The first excitation light has a first wavelength range, and the second excitation light has a second wavelength range. The controller is also configured to control an optical detection unit of the imaging device to receive fluorescence light emitted by the excited first and second fluorophore species, and to control the optical detection unit of the imaging device to separate the received fluorescence light into at least two spectral detection channels. A first spectral detection channel corresponds to a first wavelength band comprising at least a part of the emission spectrum of the first fluorophore species. A second spectral detection channel corresponds to a second wavelength band comprising at least a part of the emission spectrum of the second fluorophore species. The controller is also configured to control the optical detection unit of the imaging device to detect photon arrival times of the received fluorescence light relative to light pulses of the second excitation light. The controller is further configured to determine a temporal correlation between the pulses of the second excitation light and the photon arrival times, and to determine a first number and a second number of photons received in the first and/or second spectral detection channel based on the temporal correlation. The first number counts photons emitted by the first fluorophore species, and the second number counts photons emitted by the second fluorophore species. The determination of the temporal correlation between the pulses of the second excitation light and the photon arrival times can for example be done as described in EP 3 761 010 A1, the complete content thereof is included herein by reference. Alternatively, or additionally, the detection of photon arrival times of the received fluorescence light relative to pulses of the second excitation light could be accomplished by suitable temporal gating settings of one or more detection channels. Furthermore, any fitting or non-fitting lifetime analysis approach can be used for the basis for determining the lifetime correlation or uncorrelation of the detected signals.

A continuous light source in the sense of this document is a light source which emits continuous, for example uninterrupted, light. A pulsed light source in the sense of this document is a light source which emits light having a pulse shape or which emits continuous light which is then transformed into pulsed light, for example by a chopper wheel or other means to temporarily interrupt the light flux.

Preferably, the first wavelength band is selected such that the first spectral detection channel captures most of the fluorescence light emitted by the first fluorophore species. Likewise, the second wavelength band is selected such that the second spectral detection channel captures most of the fluorescence light emitted by the second fluorophore species. However, there is inevitably an overlap between the emission spectra of the first and second fluorophore species. Therefore, the first wavelength band might comprise fluorescence light emitted by the second fluorophore species and/or the second spectral detection channel might comprise fluorescence light emitted by the first fluorophore species. In order to separate the contributions of the first and second fluorophore species to the first and second spectral detection channels, respectively, spectral unmixing is needed. The proposed controller is configured to perform said spectral unmixing as will be explained in the following.

The pulsed light source is controlled such that the second excitation light is emitted periodically, wherein a period comprises an interval in which the pulsed light source emits the second excitation light, and an interval in which the pulsed light source does not emit the second excitation light. The second fluorophore species are only excited during intervals in which the second excitation light is emitted. As a consequence, the emission of fluorescence light by the second fluorophore species exhibits a periodic pattern that is highly correlated with the pattern in which the pulsed light source emits the second excitation light. The arrival times of the photons of the fluorescence light are therefore also correlated with the pattern in which the pulsed light source emits the second excitation light. The continuous light source is controlled such that the first excitation light is continuously emitted. The first fluorophore species are therefore continuously excited and continuously emit fluorescence light. Consequently, the emission of fluorescence light by the first fluorophore species exhibits no periodic pattern that is correlated with the pattern in which the pulsed light source emits the second excitation light. The emission of fluorescence light by the first fluorophore species is uncorrelated in the sense that noise is uncorrelated.

By determining the correlation between the photon arrival times and the emission pattern of the pulsed light source, the controller can determine how many of the detected photons are likely emitted by the first fluorophore species, i.e. the first number, and how many of the detected photons are likely emitted by the second fluorophore species, i.e. the second number. The first and second numbers may then be used to unmix the contributions of the first and second fluorophore species to the first and/or second spectral detection channel. The unmixing performed by the proposed controller requires no a priori knowledge of a fluorescence lifetime of the two fluorophore species used. Further, the unmixing performed by the proposed controller is also robust in the sense that it is not sensitive to changes in the fluorescence lifetime of the two fluorophore species that may occur during an experiment.

In a preferred embodiment, the controller is configured to control at least one additional continuous light source of the imaging device to emit third excitation light in order to excite third fluorophore species. The third excitation light has a third wavelength range. According to the present embodiment, the controller is also configured to control the optical detection unit of the imaging device to separate the received fluorescence light into at least three spectral detection channels. A third spectral detection channel corresponding to a third wavelength band comprising at least a part of the emission spectrum of the third fluorophore species and a part of the emission spectrum of the second fluorophore species. According to the present embodiment, the controller is further configured to determine a third number of photons received in the third spectral detection channel based on the temporal correlation, wherein the third number counts photons emitted by the third fluorophore species.

Preferably, the third wavelength band is selected such that the third spectral detection channel captures most of the fluorescence light emitted by the third fluorophore species. However, due to overlap between the emission spectra of the fluorophore species, the third wavelength band may comprise fluorescence light emitted by the second fluorophore species. In order to separate the contributions of the fluorophore species to the third spectral detection channel, spectral unmixing is needed. In this embodiment, the controller is configured to perform said spectral unmixing in the third spectral detection channel.

The controller determines the correlation between the photon arrival times and the emission pattern of the pulsed light source in the third spectral detection channel. The emission of fluorescence light by the second fluorophore species is correlated with the emission pattern of the pulsed light source while the emission of fluorescence light by the third fluorophore species is uncorrelated. Thus, from the correlation the controller can determine how many photons counted in the third spectral detection channel are likely emitted by the second fluorophore species, and thus how many photons are likely emitted by the third fluorophore species, i.e. the third number. The third number may then be used to unmix the contributions of the second and third fluorophore species to the third spectral detection channel.

The third wavelength band may also comprise fluorescence light emitted by the first fluorophore species. Additional unmixing is needed in this case. However, by selecting the third wavelength band accordingly, contributions by the first fluorophore species to the third spectral detection channel may be minimized to the point that they are negligible.

In another preferred embodiment, the controller is configured to control at least one additional pulsed light source of the imaging device to emit fourth excitation light in order to excite fourth fluorophore species. The fourth excitation light has a fourth wavelength range. According to the present embodiment, the controller is also configured to control the optical detection unit of the imaging device to separate the received fluorescence light into at least three, preferably four, spectral detection channels. A fourth spectral detection channel corresponds to a fourth wavelength band comprising at least a part of the emission spectrum of the fourth fluorophore species and a part of the emission spectrum of the first, second and/or third fluorophore species. According to the present embodiment, the controller is also configured to control the optical detection unit of the imaging device to detect photon arrival times of the received fluorescence light relative to pulses of the fourth excitation light and/or to detect photon arrival times of the received fluorescence light relative to pulses of the second excitation light. The controller is further configured to determine a temporal correlation between the pulses of the fourth excitation light and/or the pulses of the second excitation light and the photon arrival times, and to determine a fourth number of photons received in the fourth spectral detection channel based on the temporal correlation. The fourth number counts photons emitted by the fourth fluorophore species.

Preferably, the fourth wavelength band is selected such that the fourth spectral detection channel captures most of the fluorescence light emitted by the fourth fluorophore species. However, due to overlap between the emission spectra of the fluorophore species, the fourth wavelength band may comprise fluorescence light emitted by the first, second and/or third fluorophore species. In order to separate the contributions of the fluorophore species to the fourth spectral detection channel, spectral unmixing is needed. In this embodiment, the controller is configured to perform said spectral unmixing in the fourth spectral detection channel.

The additional pulsed light source is controlled such that the fourth excitation light is emitted periodically, wherein a period comprises an interval in which the pulsed light source emits the fourth excitation light, and an interval in which the pulsed light source emits no light. The fourth fluorophore species is only excited during intervals in which the fourth excitation light is emitted and the fluorophore species is illuminated with the fourth excitation light. As a consequence, the emission of fluorescence light by the fourth fluorophore species exhibits a periodic pattern that is highly correlated with the pattern in which the additional pulsed light source emits the fourth excitation light. The arrival times of the photons of the fluorescence light emitted by the fourth fluorophore species are therefore also correlated with the pattern in which the additional pulsed light source emits the fourth excitation light. Contrary thereto, the arrival times of the photons of the fluorescence light by the first and/or third fluorophore species are not correlated with the pattern in which the additional pulsed light source emits the fourth excitation light.

The controller determines the correlation between the photon arrival times and the emission pattern of the additional pulsed light source in the fourth spectral detection channel. Thereby, the controller can determine how many photons counted in the fourth spectral detection channel are likely emitted by the fourth fluorophore species, i.e. the fourth number, and thus how many photons are likely emitted by the first and/or third fluorophore species and therefore should not be assigned to the fourth number but to the first or third number. The fourth number may then be used to unmix the contributions of the first, third and fourth fluorophore species to the fourth spectral detection channel.

The fourth wavelength band may comprise fluorescence light emitted by the second fluorophore species. Contributions by the second fluorophore species to the fourth spectral detection channel may be minimized to the point that they are negligible by selecting the fourth wavelength band accordingly. Further, the pattern of the additional pulsed light source, i.e. the period length, may in particular be different from the period length of the pulsed light source emitting the second excitation light. In other words, the pulse frequency of the (second and fourth) pulsed light source might be different and/or the pulses emitted by the (second and fourth) pulsed light sources might be asynchronously emitted or illuminating the fluorophore species. Thereby, the contributions by the second fluorophore species to the fourth spectral detection channel can be identified due to their correlation to the pattern of the pulsed light source emitting the second excitation light. On the other hand, contributions by the fourth fluorophore species to the fourth spectral detection channel can be identified due to their correlation to the pattern of the additional pulsed light source emitting the fourth excitation light.

The controller may be configured to control additional light sources to emit additional excitation lights. The additional light sources may be pulsed or continuous. For each additional light source, the controller is configured to control the optical detection unit to separate the received fluorescence light into an additional spectral detection channel corresponding to an additional wavelength band. Unmixing in the additional spectral detection channels is performed on the same principles described above.

The first, second, third, and/or fourth wavelength range of the excitation lights may have a width of at least 2 nm, and a width of for example 10 nm, 20 nm or up to 50 nm but might extend to something at most 300 nm. Alternatively, the first, second, third, and/or fourth wavelength range may comprise a single wavelength. Therefore, when referring to excitation light, the terms wavelength and wavelength range are used interchangeably within this document. The first, second, third, and/or fourth wavelength bands of the spectral detection channels may have a width of at least 2 nm, preferable at least 10 nm, and a width of at most 300 nm.

Alternatively, the first, second, third, and/or fourth wavelength bands may comprise a single wavelength.

The wavelength bands of the spectral detection channels may be arranged such that a wavelength band comprising mostly fluorescence light emitted by fluorophore species that have been excited by a continuous light source is followed by a wavelength band comprising mostly fluorescence light emitted by fluorophore species that have been excited by a pulsed light source. In this alternating arrangement of wavelength bands, it is possible to identify crosstalk between fluorophore species excited by one type of light source, i.e. either continuous or pulsed, in the individual spectral detection channels and therefore to greatly reduce the "undesired" detected crosstalk contribution during detection and in ideal cases even completely clean up such undesired contributions. This in turn makes it easier to identify a fluorophore species based on the temporal correlation between the photon arrival times and the emission patterns of the pulsed light sources.

The wavelength ranges of the excitation lights and the wavelength bands of the spectral detection channels may in particular be arranged in an alternating fashion. However, depending on the size of the Stokes shift of the fluorophore species used, this may not be an ideal arrangement. In particular a large Stokes shift may require another arrangement of the wavelength ranges and the wavelength bands.

In another preferred embodiment, the controller is configured to determine the first number and the second number and/or the third number and/or the fourth number using machine learning or deep learning. In this embodiment, the controller uses machine learning or deep learning to distinguish the different fluorescence signals. In particular, the controller uses machine learning or deep learning to determine the temporal correlation between the pulses of excitation light of the pulsed light sources and the photon arrival times. The use of machine learning or deep learning can greatly aid the determination of the first, second, third and/or the fourth number, and thereby improve the reliability of the controller. Machine learning techniques include but are not limited to support vector machines and neural networks. Most machine learning and deep learning techniques require either supervised or unsupervised training using an appropriate training dataset. The choice of the training dataset depends on the specific task of the machine learning or deep learning technique used. An appropriate training dataset for the determination of the first, second, third and/or the fourth number may comprise simulated data, for example generated by means of Monte Carlo methods.

Embodiments of the present invention also relate to an imaging device, comprising a controller described above. The imaging device also comprises at least one continuous light source configured to emit first excitation light, and at least one pulsed light source configured to emit second excitation light. The first excitation light has a first wavelength range, and the second excitation light has a second wavelength range. The imaging device further comprises an optical detection unit configured to receive fluorescence light emitted by the excited first and second fluorophore species, to separate the received fluorescence light into the at least two spectral detection channels, and to detect the photon arrival times of the received fluorescence light relative to pulses of the second excitation light.

The imaging device has the same advantages as the controller described above and can be supplemented using the features of the dependent claims directed at the controller.

The optical detection unit of the imaging device is configured to detect the photon arrival times, i.e. the optical detection unit is capable of a time-resolved detection of the photons of the received fluorescence light. The time-resolved detection of the photons of the received fluorescence light is realized for example by assigning an arrival time to each detected photon. Preferably, the optical detection unit comprises at least one detector element capable of assigning an arrival time to a detected photon.

In a preferred embodiment, the optical detection unit comprises at least one detector element capable of photon counting. In this embodiment, the optical detection unit is configured to assign an arrival time to each detected photon by means of the at least one photon counting capable detector element. Photon counting can improve temporal resolution of the detector element. The temporal resolution greatly affects the quality of the determination of the temporal correlation between the pulses of the excitation light and the photon arrival times, and therefore the determination of the first, second, third and/or fourth numbers. Improving the temporal resolution therefore greatly improves the unmixing performed by the controller of the imaging device.

In another preferred embodiment, the optical detection unit comprises at least one objective, preferably a microscope objective, for receiving the fluorescence light emitted by the first and second fluorophore species. An objective may provide magnification allowing small details to be resolved that would be invisible to the unaided eye. Thereby, for example, smaller structures of a sample may be imaged by the imaging device.

In another preferred embodiment, the continuous light source and/or the pulsed light source comprise at least one laser light source. The laser light source may for example be a pulsed laser source in the VIS or IR range. Using laser light for exciting the fluorophore species has some advantages. For example, laser light exhibits coherence, and can thus be focused more easily and has a higher power density than incoherent light. Alternatively, or additionally, the continuous light source and/or the pulsed light source may comprise other light sources, for example LED elements or a gas-discharge lamp such as an argon lamp.

In another preferred embodiment, the pulsed light source comprises a supercontinuum laser light source being configured to emit supercontinuum laser light or a white light laser source. Supercontinuum laser light typically comprises a frequency range of one octave or more. The supercontinuum laser light source or a white light laser source can therefore be used to excite a wide range of fluorophore species by extracting for example different single wavelength ranges or single wavelengths from the supercontinuum laser light to be used as excitation lights from the supercontinuum or white laser light, for example by means of filters, ins particular tunable filters such as acousto optical tunable filters. In this embodiment, fewer light sources are used making the imaging device more compact.

In another preferred embodiment, the optical detection unit comprises at least two detector elements and beam splitting means that are configured to direct the received fluorescence light having a wavelength range in the first wavelength band onto a first detector element capable of assigning an arrival time to a detected photon, and to direct the received fluorescence light having a wavelength range in the second wavelength band onto a second detector element capable of assigning an arrival time to a detected photon. In this embodiment, the beam splitting element and the first and second detector elements are used as means for generating the first and second spectral detection channels. Compared to other means for generating the first and second spectral detection channels using the beam splitting element and the first and second detector elements is easy to implement, cost-effective, and reliable. Further, such an optical arrangement has the advantage that the fluorescence light received by the optical detection unit is distributed among the detector elements, and thus little to no fluorescence light is lost.

In another preferred embodiment, the optical detection unit comprises a multispectral camera or a hyper spectral camera configured to generate the at least two spectral detection channels and capable of assigning an arrival time to a detected photon. A multispectral camera is configured to capture a limited number of wavelength bands, typically less than or around 10. Each of these wavelength bands maybe a spectral detection channel of the optical detection unit. A hyperspectral camera is configured to capture tens or hundreds of wavelength bands per pixel. In other words, hyperspectral images have a very high spectral resolution. More wavelength bands allow for a much finer differentiation of sources of fluorescence based on their emission spectrum, and thereby increases the sensitivity and reliability of the imaging device.

In another preferred embodiment, the imaging device is a microscope, in particular a confocal microscope.

Embodiments of the present invention further relate to a method for spectral unmixing using an imaging device, the method comprising the following steps: Exciting first fluorophore species with first excitation light emitted by a continuous light source, the first excitation light having a first wavelength range. Exciting second fluorophore species with second excitation light emitted by a pulsed light source, the second excitation light having a second wavelength range. Receiving fluorescence light emitted by the excited first and second fluorophore species. Separating the received fluorescence light into at least two spectral detection channels, a first spectral detection channel corresponding to a first wavelength band comprising at least a part of the emission spectrum of the first fluorophore species, and a second spectral detection channel corresponding to a second wavelength band comprising at least a part of the emission spectrum of the second fluorophore species. Detecting photon arrival times of the received fluorescence light relative to pulses of the second excitation light. Determining a temporal correlation between the pulses of the second excitation light and the photon arrival times. Determining a first number and a second number of photons received in the first and/or second spectral detection channel based on the temporal correlation, wherein the first number counts photons emitted by the first fluorophore species, and the second number counts photons emitted by the second fluorophore species.

The method has the same advantages as the controller and the imaging device described above and can be supplemented using the features of the dependent claims directed at the controller and/or the imaging device.

FIG. 1 is a schematic view of an imaging device 100 according to an embodiment.

The imaging device 100 is configured to image a sample 102 comprising different fluorophore species by means of fluorescence imaging. In the present embodiment, the imaging device 100 is exemplary formed as a microscope. However, the imaging device 100 is not limited to be a microscope.

Figure 3:
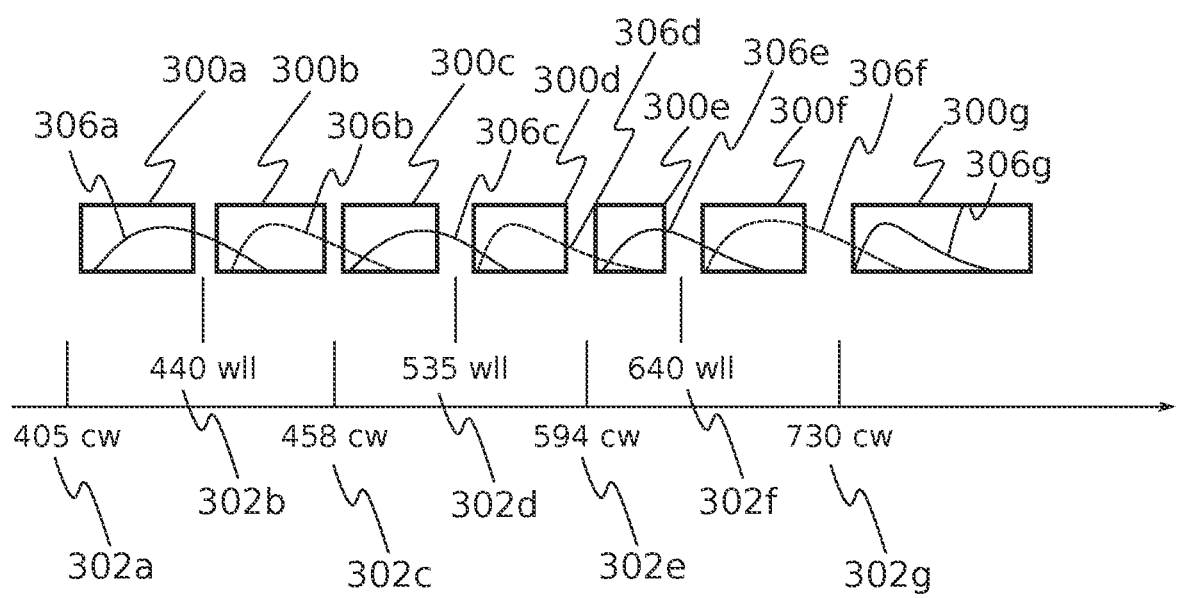
FIG. 3 is a schematic view of spectral detection channels of the imaging device according to FIGS. 1 and 2, according to an embodiment.

The imaging device 100 exemplary comprises four continuous light sources, and three pulsed light sources. In FIG. 1 only a first continuous light source 104 and a first pulsed light source 106 are show. The remaining light sources are indicated by little black dots. The continuous light sources 104 are configured to emit first, third, fifth and seventh excitation light 302a, 302c, 302e, 302g (c.f. FIG. 3), respectively. The pulsed light sources 106 are configured to emit second, fourth, and sixth excitation light 302b, 302d, 302f (c.f. FIG. 3), respectively. Each of the excitation lights excites a different fluorophore species located in the sample 102.

For capturing an image of the sample 102, the imaging device 100 comprises an optical detection unit 108. The optical detection unit 108 comprises an objective 110 directed at the sample 102, a beam splitting unit 112, and a detector element 114. The objective 110 receives fluorescence light emitted by the excited fluorophore species located the sample 102 and directs the received detection light towards the detector element 114. The beam splitting unit 112 is configured to direct the excitation lights through the objective 110 into the sample 102, and to direct the received fluorescence light onto the detector element 114. In the present embodiment, the detector element 114 is formed as a multispectral camera capable of a time-resolved detection of photons of the received fluorescence light. The multispectral camera is configured to capture seven different wavelength bands 300a, 300b, 300c, 300d, 300e, 300f, 300g (c.f. FIG. 3). Each of the seven wavelength bands 300a, 300b, 300c, 300d, 300e, 300f, 300g corresponds a spectral detection channel of the optical detection unit 108. An alternative optical detection unit 200 is described below with reference to FIG. 2.

The imaging device 100 further comprises a controller 116. The controller 116 is connected to the optical detection unit 108 and the light sources 104, 106, and is configured to control the imaging device 100. In particular, is configured to perform a method for spectral unmixing that is described below with reference to FIGS. 4 to 7.

Figure 2:
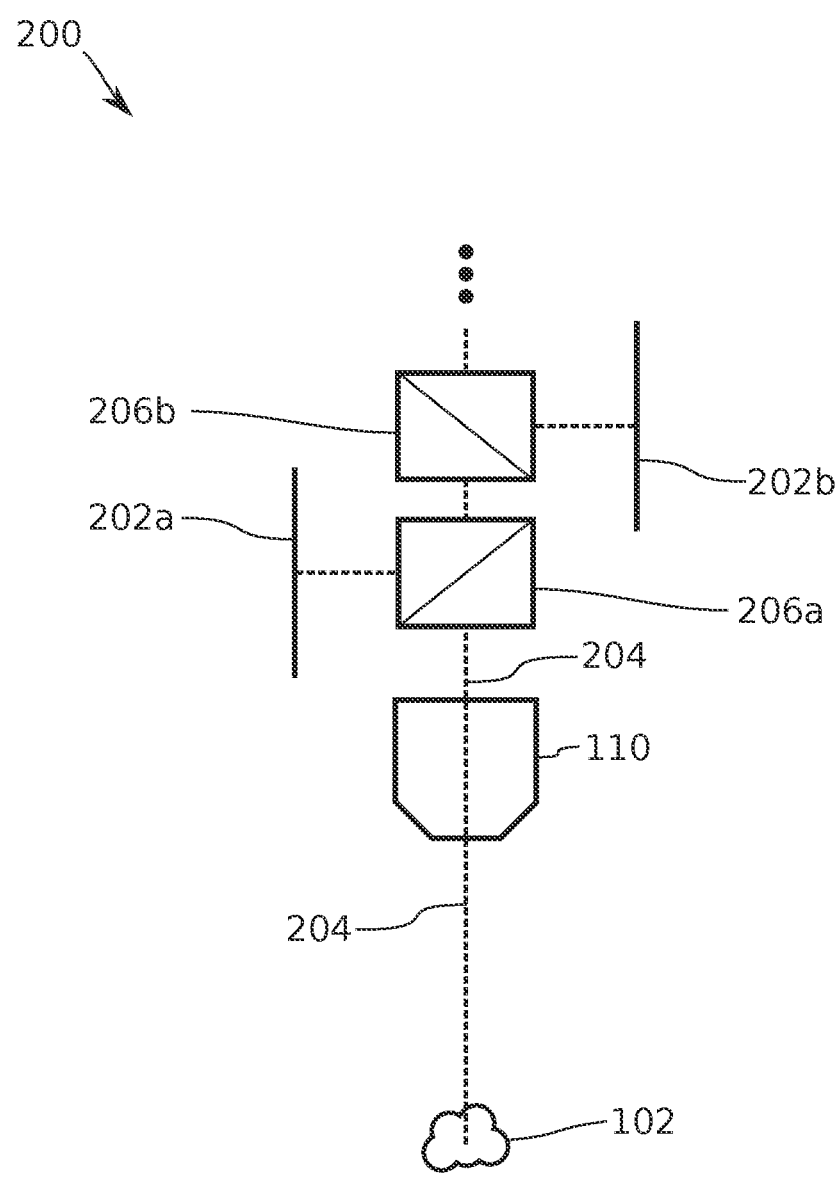
FIG. 2 is a schematic view of an alternative optical detection unit of the imaging device according to FIG. 1, according to an embodiment.

FIG. 2 is a schematic view of an alternative optical detection unit 200 of the imaging device 100 according to FIG. 1.

The optical detection unit 200 according to FIG. 2 is distinguished from the optical detection unit 108 according to FIG. 1 in how the spectral detection channels are realized. In the present embodiment, the spectral detection channels are realized by individual detector elements 202a, 202b instead of the multispectral camera.

According to the present embodiment, the optical detection unit 200 comprises seven beam splitting elements 206a, 206b, for example dichroic elements or an acousto optic tunable filters (AOTF), arranged along a detection beam path 204. FIG. 2 only shows the first two of the beam splitting elements 206a, 206b. The remaining beam splitting elements and further detector elements are denoted in FIG. 2 by little black dots. Each of the beam splitting elements 206a, 206b is configured to direct a specific wavelength band of the received fluorescence light onto one of the detector elements 202a, 202b, and to direct the remaining fluorescence light towards to next beam splitting element 206a, 206b along the detection beam path. Each detector element 202a, 202b receives fluorescence light of a predetermined wavelength band, thereby, the spectral detection channels are realized.

FIG. 3 is a schematic view of the spectral detection channels of the imaging device 100 according to FIGS. 1 and 2.

FIG. 3 is a wavelength diagram showing shorter wavelengths to the left and longer wavelengths to the right. The wavelength bands 300a, 300b, 300c, 300d, 300e, 300f, 300g corresponding to the seven spectral detection channels are shown as rectangles. As can be seen from FIG. 3, there is no overlap between the spectral detection channels.

The wavelength ranges of the excitation lights are shown as vertical lines. A first excitation light is emitted by one of the continuous light sources 104, as indicated by "cw" in FIG. 3, and has a first wavelength 302a of 405 nm. A second excitation light is emitted by one of the pulsed light sources 106, in particular, by a white light laser, as indicated by "wll" in FIG. 3, and has a second wavelength 302b of 440 nm. A third excitation light is emitted by one of the continuous light sources 104, and has a third wavelength 302c of 458 nm. A fourth excitation light is emitted by one of the pulsed light sources 106, in particular by a white light laser, and has a fourth wavelength 302d of 535 nm. A fifth excitation light is emitted by one of the continuous light sources 104, and has a fifth wavelength 302e of 594 nm. A sixth excitation light is emitted by one of the pulsed light sources 106, in particular by a white light laser, and has a sixth wavelength 302f of 640 nm. A seventh excitation light is emitted by one of the continuous light sources 104, and has a seventh wavelength 302g of 730 nm. According to the present embodiment, the emission wavelengths of the continuous light sources 104 and the pulsed light sources 106 are arranged in an alternating fashion.

FIG. 3 also shows the emission spectra 306a, 306b, 306c, 306d, 306e, 306f, 306g of the different fluorophore species. Each of the different fluorophore species is excited by a different excitation light. Due to Stokes shift, the emission spectra 306a, 306b, 306c, 306d, 306e, 306f, 306g of a fluorophore species comprises longer wavelengths than the excitation light that excites that fluorophore species. Therefore, the emission spectrum 306a, 306b, 306c, 306d, 306e, 306f, 306g of a fluorophore species in FIG. 3 is always to the right of the wavelength 302a, 302b, 302c, 302d, 302e, 302f, 302g of the excitation light that excites that fluorophore species. The emission spectra 306a, 306c, 306e, 306g of fluorophore species excited by a continuous light source 104 are shown as solid lines while the emission spectra 306b, 306d, 306f of fluorophore species excited by a pulsed light source 106 are shown as dashed lines. A first fluorophore species is excited by the first excitation light. The emission spectrum 306a of the first fluorophore species lies almost entirely within the first wavelength band 300a of the first spectral detection channel. However, the emission spectrum 306a of the first fluorophore species extends into the second wavelength band 300b of the second spectral detection channel. A second fluorophore species is excited by the second excitation light. The emission spectrum 306b of the second fluorophore species lies almost entirely within the second wavelength band 300b of the second spectral detection channel and extends into the third wavelength band 300c of the third spectral detection channel. A third fluorophore species is excited by the third excitation light. The emission spectrum 306c of the third fluorophore species lies almost entirely within the third wavelength band 300c of the third spectral detection channel and extends into the fourth spectral detection channel. A fourth fluorophore species is excited by the fourth excitation light. The emission spectrum 306d of the fourth fluorophore species lies almost entirely within the fourth wavelength band 300d of the fourth spectral detection channel and extends into the fifth wavelength band 300e of the fifth spectral detection channel. A fifth fluorophore species is excited by the fifth excitation light. The emission spectrum 306e of the fifth fluorophore species lies almost entirely within the fifth wavelength band 300e of the fifth spectral detection channel and extends into the sixth wavelength band 300f of the sixth spectral detection channel. A sixth fluorophore species is excited by the sixth excitation light. The emission spectrum 306f of the sixth fluorophore species lies almost entirely within the sixth wavelength band 300f of the sixth spectral detection channel and extends into the seventh wavelength band 300g of the seventh spectral detection channel. A seventh fluorophore species is excited by the seventh wavelength band 300g of the seventh excitation light. The emission spectrum 306g of the seventh fluorophore species lies entirely within the seventh spectral detection channel.

There is crosstalk in all spectral detection channels but the first spectral detection channel. However, due to the alternating arrangement of the emission wavelengths 302a, 302c, 302e, 302g of the continuous light sources 104 and the emission wavelengths 302b, 302d, 302f of the pulsed light sources 106, there is only ever crosstalk between fluorophore species that are excited by different types of light sources 104m 106, i.e. continuous and pulsed. This can be used to unmix the contributions of different fluorophore species to a single spectral detection channel. The method for spectral unmixing will be described in the following with reference to FIGS. 4 to 7.

The arrangement of the wavelength bands 300a, 300b, 300c, 300d, 300e, 300f, 300g of the spectral detection channels and the wavelengths of the 302a, 302b, 302c, 302d, 302e, 302f, 302g excitation lights show in FIG. 3 is to be understood as exemplary. The lowest wavelength excitation light may be emitted by a pulsed light source 106 instead of by a continuous light source 104 as shown in FIG. 3. It is also not necessary to have an alternating arrangement of continuous light sources 104 and pulsed light sources 106 in terms of their emission wavelength or wavelength range as shown in FIG. 3. As long as the two overlapping emission spectra in each of the spectral detection channels are the emission spectra of two of the fluorophore species excited by different types of light sources, i.e. one of the pulsed light sources 106 and one of the continuous light sources 104. For example, if one of the fluorophore species has a large Stokes shift, the order of the continuous light sources 104 and pulsed light sources 106 in terms of their emission wavelength may be different from the alternating arrangement shown in FIG. 3.

Figure 4:
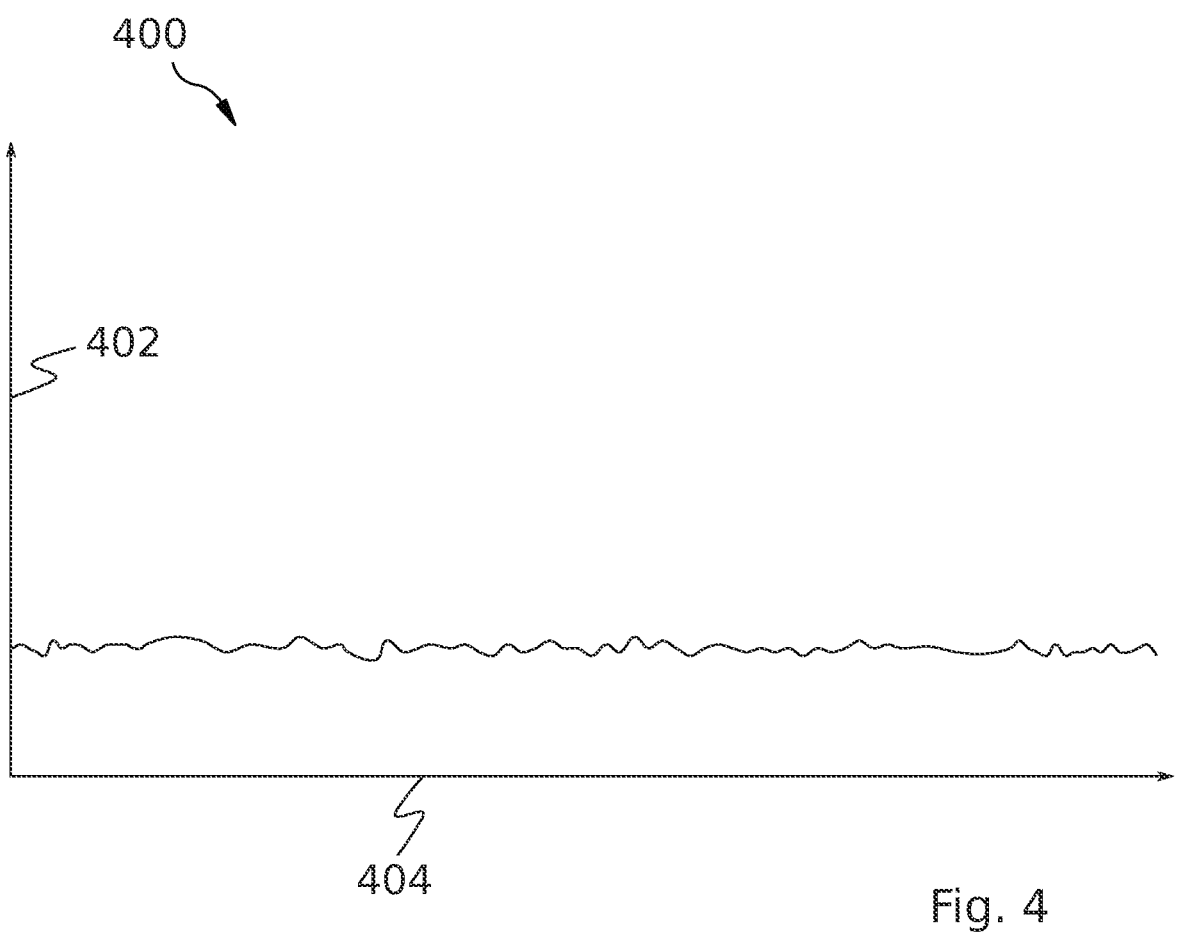
FIG. 4 is a schematic diagram of photon arrival times of fluorescence photons emitted by a first fluorophore species, according to an embodiment.

FIG. 4 is a schematic diagram 400 of the photon arrival times of fluorescence photons emitted by the first fluorophore species.

The abscissa 404 of the diagram 400 denotes time in ns. The ordinate 402 of the diagram 400 denotes the number of photons counted over a short interval in a logarithmic scale.

The continuous light source 104 continuously emits the first excitation light. The first fluorophore species is therefore excited continuously. The emission of fluorescence light by the first fluorophore species will be uncorrelated in the sense that the emission of fluorescence photons and therefore the arrival times is randomly distributed in time.

As can be seen in FIG. 4, the first fluorophore species continuously emits photons. The exact number of photons emitted during each short interval will vary slightly. But the number of photons emitted exhibits no pattern that is correlated with the emission of excitation light by any of the pulsed light sources 106.

Figure 5:
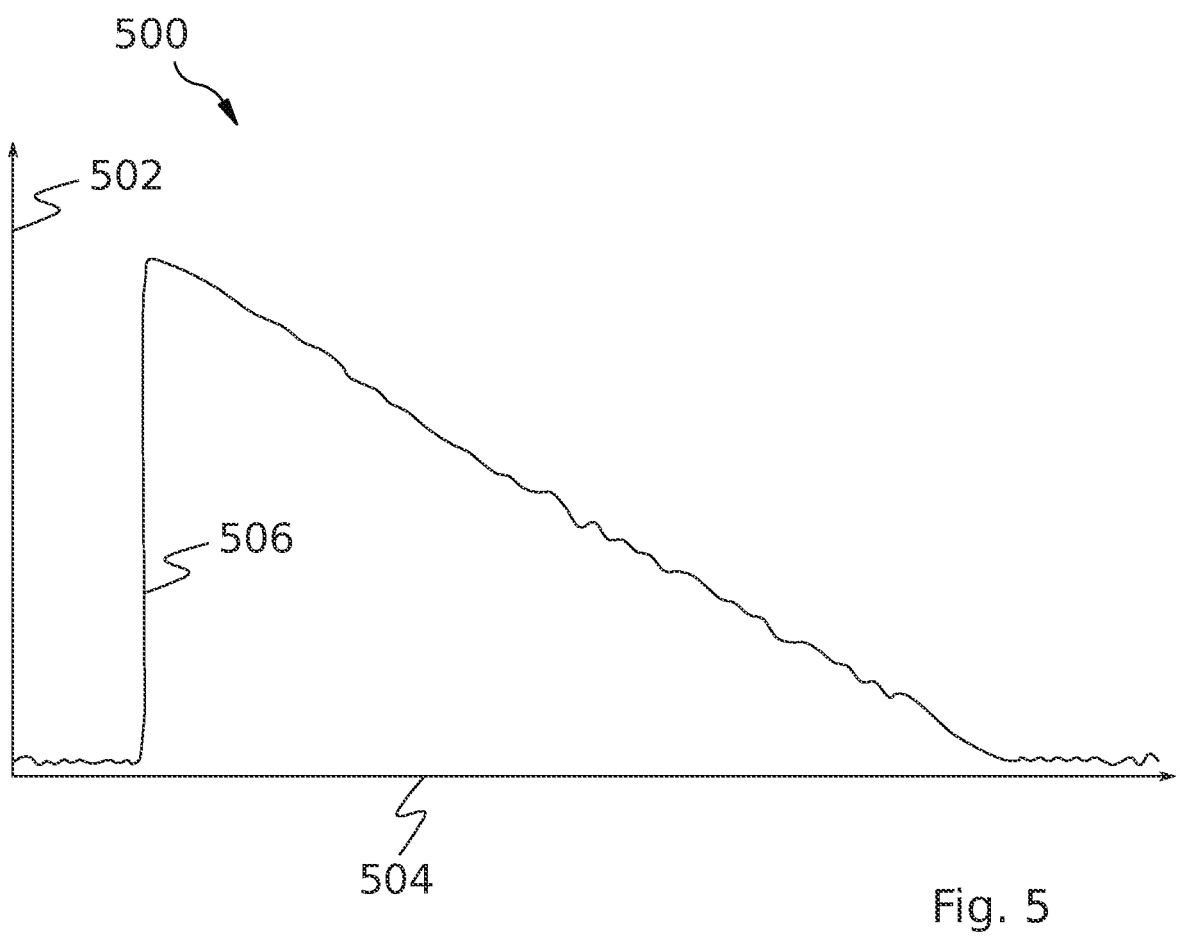
FIG. 5 is a schematic diagram of photon arrival times of fluorescence photons emitted by a second fluorophore species, according to an embodiment.

FIG. 5 is a schematic diagram 500 of the photon arrival times of fluorescence photons emitted by the second fluorophore species.

The abscissa 504 of the diagram 500 denotes time in ns. The ordinate 502 of the diagram 500 denotes the number of photons counted over a short interval in a logarithmic scale. The diagram 500 is therefore similar to a fluorescence decay histogram.

The second excitation light is emitted in short pulses by one of the pulsed light sources 106 followed by a short period of time in which the pulsed light source 106 emits no excitation light. The second fluorophore species is only excited during the periods when the pulsed light source 106 emits the second excitation light. The emission of fluorescence light by the second fluorophore species will exhibit a pattern that is correlated with the pattern in which the pulsed light source 106 emits the second excitation light.

As can be seen in FIG. 5, the second fluorophore species initially emits no photons and what can be seen on the left side of the step flank 506 is essentially noise containing no detected fluorescence photons. After the pulsed light source 106 emits a pulse of the second excitation light, the second fluorophore species will immediately begin emitting fluorescence light. The number of photons of the emitted fluorescence light will be high immediately following the pulse resulting in a step flank 506 in the photon count, and drop linearly as opposed to exponentially to its initial level over a short period of time called the fluorescence lifetime decay.

Figure 6:
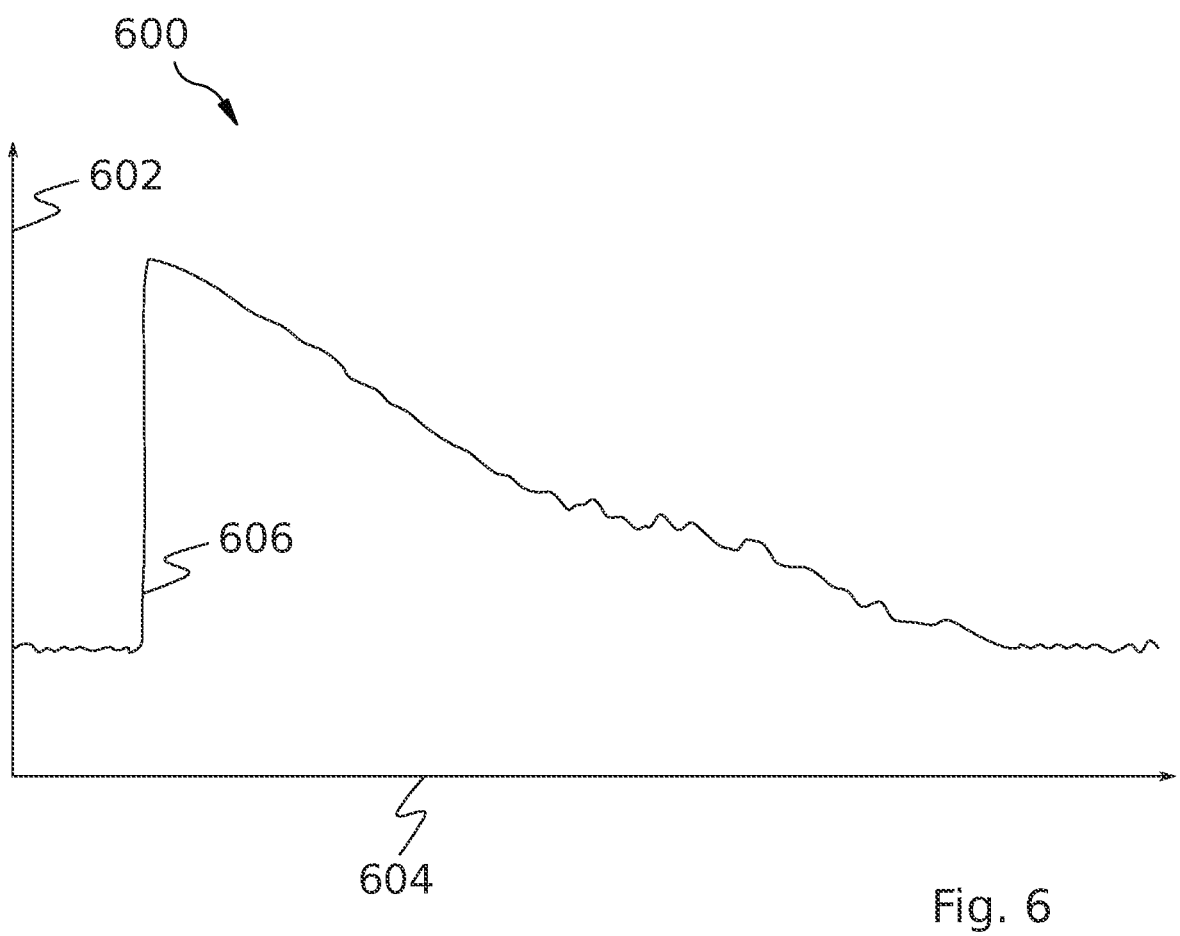
FIG. 6 is a schematic diagram of photon arrival times of fluorescence photons received in one of the spectral detection channels, according to an embodiment.

FIG. 6 is a schematic diagram 600 of the photon arrival times of fluorescence photons received in the second spectral detection channel.

The abscissa 604 of the diagram 600 denotes time in ns. The ordinate 602 of the diagram 600 denotes the number of photons counted over a short interval in a logarithmic scale.

The second spectral detection channel receives fluorescence light emitted by the first fluorophore species and fluorescence light emitted by the second fluorophore species. Thus, the photon count shown in the diagram 600 of FIG. 6 can be seen as a combination of the photon counts shown in the diagrams 400, 500 of FIGS. 4 and 5. Compared to the diagram 500 of FIG. 5, in the diagram 600 of FIG. 6 the photon count of the baseline (for example shown on the left side of the flank 606) is higher. This higher base line signal (which might include a noise level to some extend) contains the uncorrelated photons emitted by the first fluorophore species being excited by the continuous light source 104.

Initially all the fluorescence light received in the second spectral detection channel is due to the first fluorophore species excited by the continuous light source 104. After the pulsed light source 106 emits the pulse of second excitation light, the second spectral detection channel also receives fluorescence light emitted by the second fluorophore species as can be seen by the step flank 606 in the photon count.

By determining a temporal correlation between the photon arrival times and the pulses of the second excitation light, it is possible to determine a first number of photons emitted by the first fluorophore species and received in the second spectral detection channel, and to determine a second number of photons emitted by the second fluorophore species and received in the second spectral detection channel. For example, since the photon arrival times of the photons emitted by the first fluorophore species is uncorrelated, the photons may be treated as random background noise. The number of photons emitted by the first fluorophore species may therefore be subtracted from the overall photon count in the second spectral detection channel in order to determine the number of photons emitted by the second fluorophore species. Thereby, the contributions of the first fluorophore species and the second fluorophore species to the second spectral detection channel have been unmixed.

The unmixing has so far only been described in the context of the second spectral detection channel. However, the everything described above with reference to FIGS. 4 to 6 also applies to the third to seventh spectral detection channels.

Figure 7:
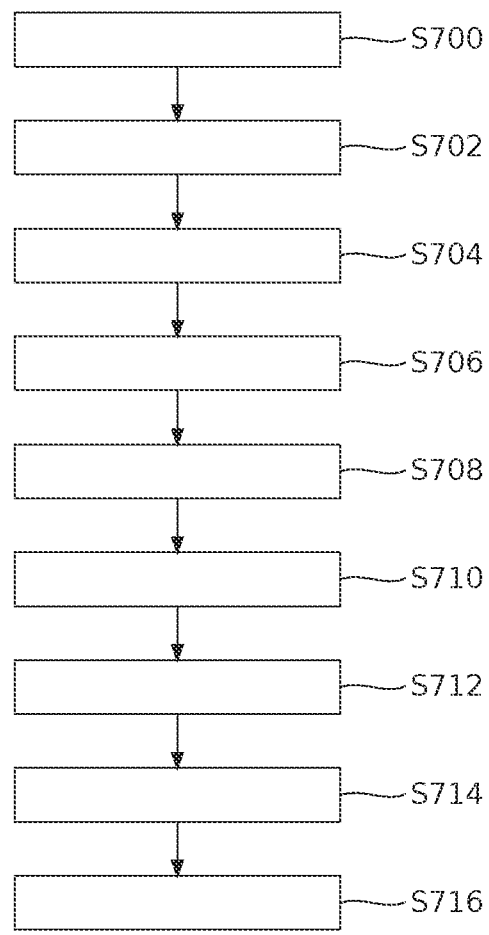
FIG. 7 is a flowchart of a method for spectral unmixing using the imaging device according to FIGS. 1 and 2, according an embodiment.

FIG. 7 is a flowchart of a method for spectral unmixing using the imaging device 100 according to FIGS. 1 and 2.

The process is started in step S700. In step S702 the controller 116 controls the continuous light sources 104 to emit the first, third, fifth, and seventh excitation lights in order to excite the first, third, fifth, and seventh fluorophore species. In step S704 the controller 116 controls the pulsed light sources 106 to emit the second, fourth, and sixth excitation lights in order to excite the second, fourth, and sixth fluorophore species. The steps S702 and S704 may be performed concurrently or consecutively in any order. In step S706 the controller 116 controls the optical detection unit 108, 200 to receive fluorescence light emitted by the excited fluorophore species. For example, in step S706 the controller 116 may control the objective 110 of the optical detection unit 108, 200 to focus on the sample 102. In step S708 the controller 116 controls the optical detection unit 108, 200 to separate the received fluorescence light into the spectral detection channels. The controller 116 may control a detection unit, for example the multispectral camera, to record photons in the wavelength bands 300a, 300b, 300c, 300d, 300e, 300f, 300g corresponding to the spectral detection channels. Alternatively, the controller 116 may control the beam splitting elements 206a, 206b to direct the wavelength bands 300a, 300b, 300c, 300d, 300e, 300f, 300g corresponding to the spectral detection channels onto the detection elements 202a, 202b. For example, the controller 116 may select a certain filter from a filter wheel or control an AOTF. In step S710 the controller 116 controls the optical detection unit 108, 200 to detect the photon arrival times of the received fluorescence light relative to pulses of the second, fourth and sixth excitation light emitted by the pulsed light sources 106. In step S712 the controller 116 determines a temporal correlation between the pulses of the second, fourth, and sixth excitation light and the photon arrival times. In step S714 the controller 116 determines based on the temporal correlation for each of the spectral detection channels a number of photons received corresponding to each of the fluorophore species. The unmixing performed in step S714 is based on the principles described above with reference to FIGS. 4 to 6. The process is stopped in step S716.

Figure 8:
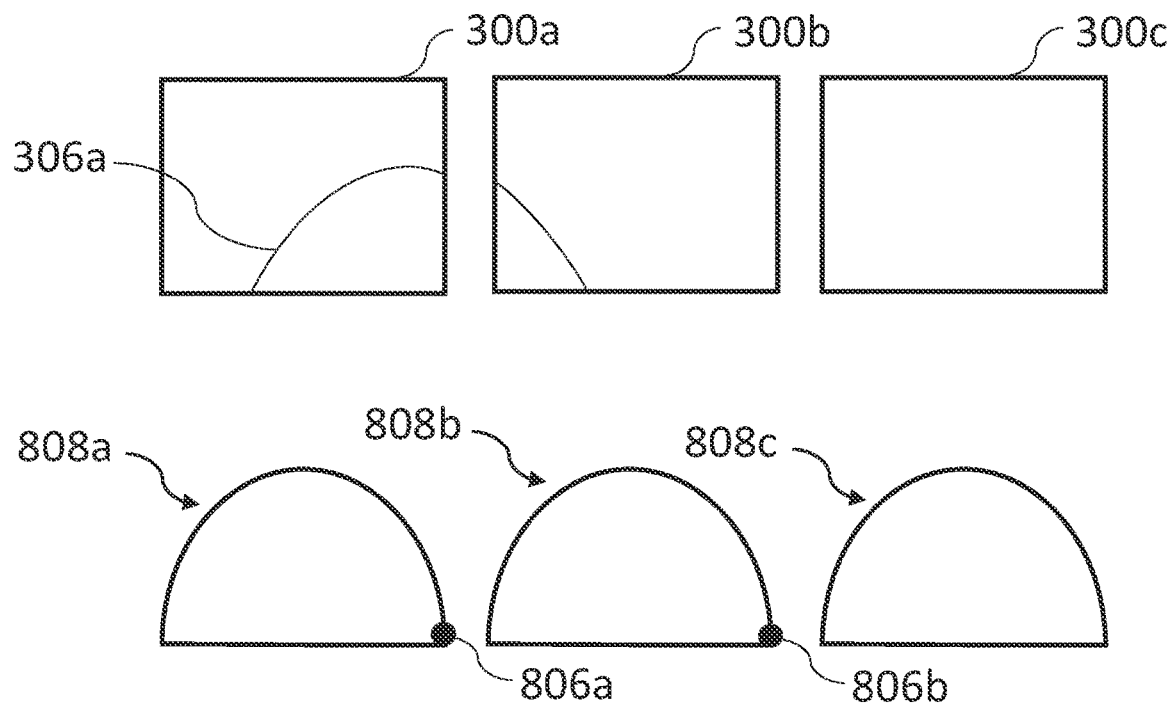
FIGS. 8*a*, 8*b* and 8*c* are schematic view of emission spectra and corresponding phasor plots according to an embodiment.
Figure 8:
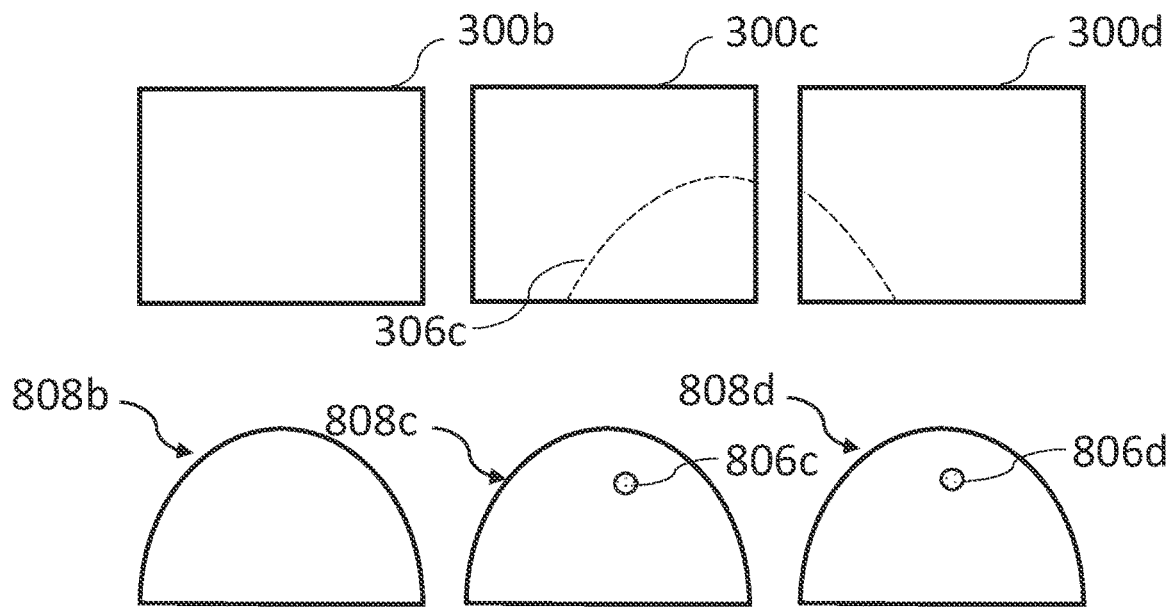
Figure 8:
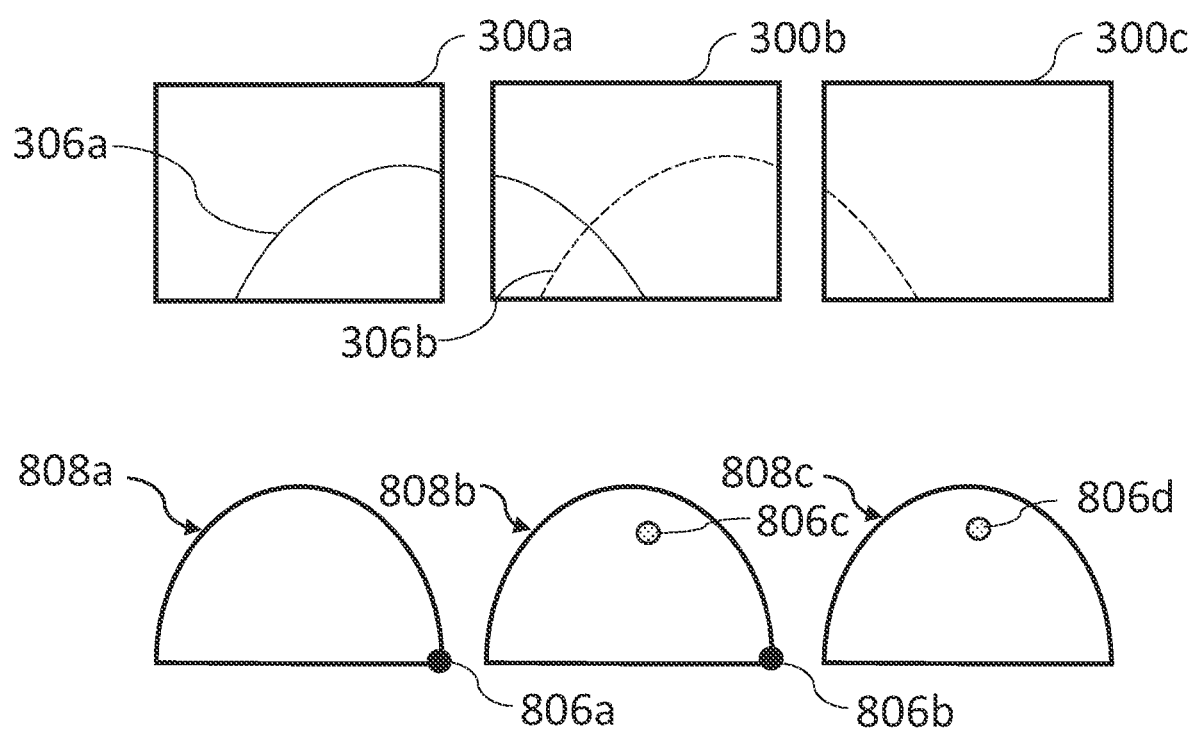

FIG. 8a is a schematic view of emission spectra and corresponding phasor plots.

In the top of FIG. 8a are three spectral channels of the spectral channels shown in FIG. 3 corresponding to three different wavelength bands 300a, 300b, 300c. The leftmost and middle wavelength bands 300a, 300b comprise the emission spectrum 306a of one of the fluorophore species. The fluorophore species corresponding to the emission spectrum 306a is excited by a continuous light source, therefore the emission spectrum 306a is shown as a solid line. Below each of the spectral channels in FIG. 8a is a corresponding phasor plot 808a, 808b and 808c.

The phasor plot and the related analysis approach might be used to analyze fluorescence lifetime. Phasor FLIM (fluorescence lifetime imaging microscopy) provides a 2D graphical view of lifetime distributions. This graphical view enables to distinguish and separate different lifetime populations within a FLIM image rapidly. Multiple molecular species are resolved within a single pixel, because every species has a specific phasor. When the data is acquired with a Time Resolved Single Photon Counting (TCSPC) system, the phasor FLIM distributions are derived from a Fourier transform, as described for example in Digman et al., The Phasor Approach to Fluorescence Lifetime Imaging Analysis, Biophys. J. (2008) vol. 94, iss. 2, pp. L14-L16. Each pixel in the image corresponds to a point in the phasor plot. The information contained in the phasor approach can be straightforwardly interpreted leading to a lifetime distribution. The rules for interpretation of a phasor plot are explained for example in E. Gratton, The Phasor approach: Application to FRET analysis and Tissue Autofluorescence, 13th LFD workshops 2018, 22-26 Oct. 2018, Laboratory for Fluorescence Dynamics (LFD), University of California, Irvine, USA. The publication Lanzano et. al. (2015), Encoding and decoding spatio-temporal information for super-resolution microscopy, Nature Communications, 6:6701, 10.1038/ncomms7701, describes a method SPLIT which can save the signal of the early photons by applying the Phasor approach. Here the lifetime decay for each pixel is translated into a polar plot, called a phasor plot. In this plot the coordinates, called a phasor, of each pixel are a linear combination of the coordinates of the three components high resolved signal, low resolved signal and background. The weight of the high resolved component is used as intensity for the resulting image and contains the information from all photons detected.

The fluorophore species corresponding to the emission spectrum $306a$ is continuously excited. The emission of fluorescence light emitted by the fluorophore species and detected in the two spectral channels corresponding to the leftmost and middle wavelength bands $300a$, $300b$ will be uncorrelated in the sense that the emission of fluorescence photons and therefore the arrival times are randomly distributed in time. This is observable by the indicated distribution $806a$ shown by a black circle at the lower right side in the leftmost phasor plot $808a$ corresponding to the leftmost wavelength band $804a$. The same is true for the second part of the emission spectrum $304a$ in the middle wavelength band $300a$ and the distribution $806b$ in the corresponding phasor plot $808b$. The rightmost wavelength bands $300c$ does not detect fluorescent light and therefore the corresponding phasor plot $808c$ has no entry.

FIG. $8b$ is a schematic view of emission spectra and corresponding phasor plots.

In the top of FIG. $8b$ are three spectral channels of the spectral channels shown in FIG. 3 corresponding to three different wavelength bands $300b$, $300c$, $300d$. The middle and right most wavelength bands $300c$, $300d$ comprise the emission spectrum $306c$ of a different fluorophore species compared to FIG. $8a$. This fluorophore species is excited by a pulsed light source, and the emission spectrum $306c$ is therefore shown as a dashed line. Below each of the wavelength bands $300b$, $300c$, $300d$ a corresponding phasor plot $808b$, $808c$ and $808d$ is shown.

The fluorophore species corresponding to the emission spectrum $306c$ is excited by pulsed light, for example by short pulses by one of the pulsed light sources followed by a short period of time in which the pulsed light source emits no excitation light. The fluorophore species corresponding to the emission spectrum $306c$ is only excited during the periods when the pulsed light source emits the respective excitation light. The emission of fluorescence light by that fluorophore species will exhibit a pattern that is correlated with the pattern in which the pulsed light source emits the second excitation light as has been described above with reference to FIG. 5. This is observable by the indicated distribution $806c$ in the middle phasor plot $808c$ shown by a black circle with little points. The same is true for the second part of the emission spectrum $304c$ in the rightmost wavelength band $300d$ and the distribution $806b$ in the corresponding phasor plot $808b$. The leftmost wavelength band $300b$ does not detect fluorescent light and therefore the corresponding phasor plot $808b$ has no entry.

FIG. $8c$ is a schematic view of emission spectra and corresponding phasor plots.

The situation shown in FIG. $8c$ is a combination of the situations shown in FIGS. $8a$ and $8b$. The phasor plots $808a$, $808b$, $808c$ of FIG. $8c$ show a first type of distribution $806a$, $806b$ and a second kind of distribution $806c$ $806d$ that can clearly can be separated from each other. The first type of distribution $806a$, $806b$ shown by black dots in the leftmost phasor plot $808a$ and the middle phasor plot $808b$ correspond to an uncorrelated arrival time of photons (because they correspond to the fluorophore species which has been exited by the continuous light source). The second type of distribution $806c$, $806d$ shown by a white dot in the middle phasor plot $808b$ and the rightmost phasor plot $808c$ correspond to a correlated arrival time of photons originating from the fluorophore species which has been exited by the pulsed light source. Because the different fluorophore species can be clearly identified with the phasor plot, it is possible to unmix the respective detected contributions of the different fluorophore species. This is possible even without having a priori knowledge of a fluorescence lifetime of the fluorophore species being used.

Identical or similarly acting elements are designated with the same reference signs in all Figures. As used herein the term "and/or" includes any and all combinations of one or more of the associated listed items and may be abbreviated as "/". Individual features of the embodiments and all combinations of individual features of the embodiments among each other as well as in combination with individual features or feature groups of the preceding description and/or claims are considered disclosed.

Although some aspects have been described in the context of an apparatus, it is clear that these aspects also represent a description of the corresponding method, where a block or device corresponds to a method step or a feature of a method step.

Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Imaging device
102 Sample
104 Continuous light source
106 Pulsed light sources
108 Optical detection unit
110 Objective
112 Beam splitting unit
114 Detector element
116 Controller
200 Optical detection unit
202a, 202b Detector element
204 Beam path
206a, 206b Beam splitting element
300a, 300b, 300c, 300d, 300e, 300f, 300g Wavelength band
302a, 302b, 302c, 302d, 302e, 302f, 302g Wavelength range
306a, 306b, 306c, 306d, 306e, 306f, 306g Emission spectrum
400 Diagram
402 Ordinate
404 Abscissa
500 Diagram
502 Ordinate
504 Abscissa
506 Flank
600 Diagram
602 Ordinate
604 Abscissa
606 Flank
808a, 808b, 808c, Phasor plot
806a, 806b, 806c, 806d, Distribution

The invention claimed is:

1. A controller for an imaging device, the controller configured to:
control a continuous light source of the imaging device to emit first excitation light in order to excite first fluorophore species, the first excitation light having a first wavelength range;
control a pulsed light source of the imaging device to emit second excitation light in order to excite second fluorophore species, the second excitation light having a second wavelength range;
control an optical detection unit of the imaging device to receive fluorescence light emitted by the excited first fluorophore species and the excited second fluorophore species;
control the optical detection unit of the imaging device to separate the received fluorescence light into at least a first spectral detection channel and a second spectral detection channel, the first spectral detection channel corresponding to a first wavelength band comprising at least a part of an emission spectrum of the first fluorophore species, and the second spectral detection channel corresponding to a second wavelength band comprising at least a part of an emission spectrum of the second fluorophore species;
control the optical detection unit of the imaging device to detect photon arrival times of the received fluorescence light relative to light pulses of the second excitation light;
determine a temporal correlation between the light pulses of the second excitation light and the photon arrival times; and
determine a first number of photons and a second number of photons received in the first spectral detection channel and/or the second spectral detection channel based on the temporal correlation, wherein the first number counts photons emitted by the first fluorophore species, and the second number counts photons emitted by the second fluorophore species.

2. The controller according to claim 1, further configured to:
control at least one additional continuous light source of the imaging device to emit third excitation light in order to excite third fluorophore species, the third excitation light having a third wavelength range;
control the optical detection unit of the imaging device to separate the received fluorescence light into a third spectral detection channel corresponding to a third wavelength band comprising at least a part of an emission spectrum of the third fluorophore species and a part of the emission spectrum of the second fluorophore species; and
determine a third number of photons received in the third spectral detection channel based on the temporal correlation, wherein the third number counts photons emitted by the third fluorophore species.

3. The controller according to claim 2, further configured to:
control at least one additional pulsed light source of the imaging device to emit fourth excitation light in order to excite fourth fluorophore species, the fourth excitation light having a fourth wavelength range;
control the optical detection unit of the imaging device to separate the received fluorescence light into a fourth spectral detection channel corresponding to a fourth wavelength band comprising at least a part of the emission spectrum of the fourth fluorophore species and a part of the emission spectrum of the first fluorophore species, the second fluorophore species, and/or the third fluorophore species;
control the optical detection unit of the imaging device to detect photon arrival times of the received fluorescence light relative to light pulses of the fourth excitation light;
determine a second temporal correlation between the light pulses of the fourth excitation light and the photon arrival times of the received fluorescence light relative to pulses of the fourth excitation light; and
determine a fourth number of photons received in the fourth spectral detection channel based on the second temporal correlation, wherein the fourth number counts photons emitted by the fourth fluorophore species.

4. The controller according to claim 3, wherein the controller is configured to determine the first number and the second number, and/or the third number, and/or the fourth number using machine learning or deep learning.

5. An imaging device, comprising:
a controller according to claim 1;
at least one continuous light source configured to emit first excitation light, the first excitation light having a first wavelength range;
at least one pulsed light source configured to emit second excitation light, the second excitation light having a second wavelength range; and
an optical detection unit configured to receive fluorescence light emitted by the excited first fluorophore species and the second fluorophore species, to separate the received fluorescence light into at least the first spectral detection channel and the second spectral detection channel, and to detect photon arrival times of the received fluorescence light relative to light pulses of the second excitation light.

6. The imaging device according to claim 5, wherein the optical detection unit comprises at least one detector element capable of assigning an arrival time to a detected photon.

7. The imaging device according to claim 5, wherein the optical detection unit comprises at least one detector element capable of photon counting.

8. The imaging device according to claim 5, wherein the optical detection unit comprises at least one objective for receiving the fluorescence light emitted by the first fluorophore species and the second fluorophore species.

9. The imaging device according to claim 5, wherein the continuous light source and/or the pulsed light source comprise at least one laser light source.

10. The imaging device according to claim 9, wherein the pulsed light source comprises a supercontinuum laser light source configured to emit supercontinuum laser light or a white light laser source.

11. The imaging device according to claim 5, wherein the optical detection unit comprises at least a first detector element and a second detector element, and a beam splitting element that is configured to direct the received fluorescence light having a wavelength range in the first wavelength band onto the first detector element that is capable of assigning an arrival time to a detected photon, and to direct the received fluorescence light having a wavelength range in the second wavelength band onto the second detector element that is capable of assigning an arrival time to a detected photon.

12. The imaging device according to claim 5, wherein the optical detection unit comprises a multispectral camera or a hyper spectral camera that is configured to generate the at least first spectral detection channel and the second spectral detection channel, and is capable of assigning an arrival time to a detected photon.

13. The imaging device according to claim 5, wherein the imaging device comprises a microscope.

14. The imaging device according to claim 13, wherein the imaging device comprises a confocal microscope.

15. A method for spectral unmixing using an imaging device, the method comprising:
exciting first fluorophore species with first excitation light emitted by a continuous light source, the first excitation light having a first wavelength range;
exciting second fluorophore species with second excitation light emitted by a pulsed light source, the second excitation light having a second wavelength range;
receiving fluorescence light emitted by the excited first fluorophore species and the second fluorophore species;
separating the received fluorescence light into at least a first spectral detection channel and a second spectral detection channel, the first spectral detection channel corresponding to a first wavelength band comprising at least a part of an emission spectrum of the first fluorophore species, and the second spectral detection channel corresponding to a second wavelength band comprising at least a part of an emission spectrum of the second fluorophore species;
detecting photon arrival times of the received fluorescence light relative to light pulses of the second excitation light;
determining a temporal correlation between the light pulses of the second excitation light and the photon arrival times; and
determining a first number of photons and a second number of photons received in the first spectral detection channel and/or the second spectral detection channel based on the temporal correlation, wherein the first number counts photons emitted by the first fluorophore species, and the second number counts photons emitted by the second fluorophore species.

* * * * *